United States Patent Office 3,486,914
Patented Dec. 30, 1969

3,486,914
NOVEL GLASS COMPOSITIONS
Bhogaraju V. Janakirama-Rao, Toledo, Ohio, assignor to Owens-Illinois, Inc., a corporation of Ohio
No Drawing. Filed June 9, 1967, Ser. No. 644,831
Int. Cl. C03c 3/10, 3/30; G02b 1/00
U.S. Cl. 106—47                    8 Claims

ABSTRACT OF THE DISCLOSURE

An essentially vitreous glass composition wherein said glass consists essentially of 80 to 85 weight percent PbO, 1 to 10 weight percent $TeO_2$, 1 to 10 weight percent $SiO_2$, 0 to 2 weight percent $TiO_2$, and 0 to 5 weight percent $B_2O_3$ and wherein the glass has a refractive index above 2.0 and can be used to make glass beads for light reflection and refraction devices such as used in highway signs.

BACKGROUND OF THE INVENTION

The present invention pertains to novel glass compositions, and more particularly, the instant invention relates to vitreous, high refractive index glass compositions consisting of lead, tellurium, silica and other glass network forming components. Specifically, the invention pertains to vitreous, high refractive index glass compositions suitable for fabricating light reflection and refractive devices.

Earlier prior art glass compositions, compounded for a desired refractive indices, generally had a refractive index of about 1.6 and usually in the range of about 1.5 to 1.7. Past attempts to increase the refractive index of select glasses have apparently not been entirely successful as the formulation of elevated refractive index glasses was usually accompanied by an undesirable tendency towards devitrification, decreased transparency of the glass, poor resistance of the glass to aqueous attack, thermal instability, dark glass colors, and other like detrimental and undesirable physical and chemical characteristics. These, and other problems are very serious for such glasses to be effective for reflective uses. The glass compositions should evidence in addition to a desired high refractive index, decreased surface devitrification, good resistance to aqueous attack, transparency, simplicity of composition and other like desirable qualities.

Accordingly, it is a purpose of the present invention to provide novel glass compositions.

It is a further purpose of the present invention to provide novel high refractive index glass compositions.

Yet a further object of the present invention is to provide essentially vitreous glass compositions.

It is a further object of the present invention to provide novel essentially vitreous compositions of glasses which have indices of refraction of about 2.0 or over and still have other desirable physico-chemical properties.

Other objects and various features of novelty and invention, will become self evident to those skilled in the art from a reading of the following specification and accompanying claims.

SUMMARY OF THE INVENTION

According to the present invention there is provided novel, substantially vitreous glasses having a high refractive indices, usually in the range of about 2.0 to 2.5. The unobvious glass compositions of the present invention are based on a lead-tellurium-silica system and they may also include the glass forming oxides of boron, aluminum, and titanium. The novel subject glasses of the instant invention generally contain 80 to 85 weight percent PbO, 1 to 10 weight percent $SiO_2$ and 1 to 10 weight percent $TeO_2$. In addition, the $PbO$—$SiO_2$—$TeO_2$ system can contain 0 to 2 weight percent $Al_2O_3$, 0 to 2 weight percent $TiO_2$ and 0 to 5 weight percent $B_2O_3$.

Exemplary of essentially vitreous glasses of the subject invention are the following: (a) a glass consisting essentially of 80 to 85 weight percent PbO, 1 to 10 weight percent $TeO_2$ and 1 to 10 weight percent $SiO_2$; (b) a vitreous glass consisting essentially of 80 to 85 weight percent PbO, 1 to 10 weight percent $TeO_2$, 1 to 10 weight percent $SiO_2$ and 0.1 to 2 weight percent $Al_2O_3$; (c) a vitreous glass composition consisting essentially of 80 to 85 weight percent PbO, 1 to 10 weight percent $TeO_2$, 1 to 10 weight percent $SiO_2$, 0.1 to 2 weight percent $Al_2O_3$ and 0.1 to 2 weight percent $TiO_2$; (d) and a glass consisting of 80 to 85 weight percent PbO, 1 to 10 weight percent $TeO_2$, 0.1 to 10 weight percent $SiO_2$ and 0.1 to 5 weight percent $B_2O_3$.

In preparing the novel glasses of the present invention, the batch ingredients are intimately mixed by hand or in a commercially available blender and heated to such temperatures so that all the glass forming substances are present in a molten state, thereby enabling the formation of a glass from a homogenous melt. Generally, the batch ingredients were well mixed by hand and melting was done in a fused silica or in a 90% platinum 10% rhodium crucible, in an electric furnace at about 900° C. to 1100° C., for about 10 to 45 minutes in an air atmosphere. The batch ingredients were continuously stirred and agitated during the melting and heating procedure.

The batch materials employed for preparing the glasses of the subject invention were of a high degree of purity and were selected from the following commercially available materials: silicon dioxide ($SiO_2$) Kona Quintus Quartz or Ottawa Sand, aluminum oxide ($Al_2O_3$) or Alcoa A-14 alumina, lead oxide (PbO), titanium dioxide ($TiO_2$), tellurium oxide ($TeO_2$) and boric oxide ($B_2O_3$). Of course, functionally equivalent oxides, carbonates, nitrates, silicates, or any other form which does not disturb or adversely effect the subject glass composition calculated on the basis of weight percent oxide content may be utilized for forming the subject glasses.

The following examples are representative of the present invention and these examples are not to be construed as limiting as these and other obvious embodiments within the spirit and scope of the invention will be readily apparent to those versed in the art.

Example 1

A vitreous glass composition was prepared by intimately blending 84 grams of PbO, 7 grams of $SiO_2$, 1 gram of $Al_2O_3$, 7 grams of $TeO_2$ and 1 gram of $TiO_2$ to obtain a substantially homogenous mixture and then melting the mixture in an electric heated furnace, in a platinum crucible at about 1000° C. for about 45 minutes. The glass was melted in an air atmosphere. The theoretical composition for the glass thus produced is 84 weight percent PbO, 7 weight percent $SiO_2$, 1 weight percent $Al_2O_3$, 7 weight percent $TeO_2$ and 1 weight percent $TiO_2$. The essentially vitreous glass had a fiber softening point of 390° C., a thermal coefficient of expansion of $123 \times 10^{-7}$/° C. (0–300° C.) and an index of refraction of 2.20. The glass was light yellow in color, thermally stable and evidenced good resistance to water attack.

The following table, Table No. 1, lists representative theoretical analysis of various glasses, Example No. 2 to Example No. 5. These compositions were melted and formed according to the mode and manner of the present invention described in the specification supra and as set forth in Example 1.

TABLE 1

| Ingredients | Examples | | | |
| --- | --- | --- | --- | --- |
| | 2 | 3 | 4 | 5 |
| PbO | 83 | 83 | 80 | 84 |
| $SiO_2$ | 7 | 7 | | 2 |
| $TeO_2$ | 10 | 9 | 15 | 10 |
| $Al_2O_3$ | | 1 | | |
| $TiO_2$ | | | | |
| $B_2O_3$ | | | 5 | 4 |
| Refractive index | 2.10 | 2.10 | 2.20 | 2.15 |

The formulation of the subject glasses appears to be unexpected as a mixture of 90 weight percent PbO and 10 weight percent $TeO_2$ when melted in a platinum crucible does not form a glass even by drastic quenching; as, only a crystalline mass results from said melt. But, if 0.5 to 1 gram of $B_2O_3$ is added to the PbO—$TeO_2$ mixture and the three component PbO—$TeO_2$—$B_2O_3$ system melted, a thermally stable transparent glass results. Also, the addition of 0.5 to 1% $SiO_2$ in place of $B_2O_3$ has the same influence on glass formation. The addition of small quantities of $Al_2O_3$ and/or $TiO_2$ tend to add to thermal stability and chemical durability of the resulting glasses.

The vitreous glasses of the instant invention can be used to fabricate items of commerce. For example, the glasses can be used to make glass beads for light reflection and refraction devices such as used in highway signs. Also the glasses can be used in sphericle form mixed with paint to act in reflecting incident light from auto headlights back toward its source when used for highway marking and the like.

I claim:

1. An essentially vitreous glass composition wherein said glass consists essentially of 80 to 85 weight percent PbO, 1 to 10 weight percent $SiO_2$, 1 to 10 weight percent $TeO_2$, 0 to 2 weight percent $TiO_2$, 0 to 2 weight percent $Al_2O_3$ and 0 to 5 weight percent $B_2O_3$ and wherein said glasses have a refractive index of at least 2.0.

2. An essentially vitreous glass composition according to claim 1 wherein said glass consists of 80 to 85 weight percent PbO, 1 to 10 weight percent $TeO_2$, 1 to 10 weight percent $SiO_2$ and 0.1 to 2 weight percent $Al_2O_3$.

3. An essentially vitreous glass composition according to claim 1 wherein said glass consists of 80 to 85 weight percent PbO, 1 to 10 weight percent $TeO_2$, 1 to 10 weight percent $SiO_2$, 0.1 to 2 weight percent $Al_2O_3$ and 0.1 to 2 weight percent $TiO_2$.

4. An essentially vitreous glass composition according to claim 1 wherein said glass contains 0.1 to 5 weight percent $B_2O_3$.

5. An essentially vitreous glass according to claim 1 wherein said glass consists of 84 weight percent PbO, 7 weight percent $SiO_2$, 1 weight percent $Al_2O_3$, 7 weight percent $TeO_2$ and 1 weight percent $TiO_2$ and wherein said glass has a refractive index of about 2.2.

6. An essentially vitreous glass according to claim 1 wherein said glass consists of 83 weight percent PbO, 7 weight percent $SiO_2$, 9 weight percent $TeO_2$ and 1 weight percent $Al_2O_3$ and wherein said glass has a refractive index of about 2.1.

7. An essentially vitreous glass occording to claim 1 wherein said glass consists of 84 weight percent PbO, 2 weight percent $SiO_2$, 10 weight percent $TeO_2$ and 4 weight percent $B_2O_3$.

8. An essentially vitreous glass according to claim 1 wherein said glass consists of 83 weight percent PbO, 7 weight percent $SiO_2$ and 10 weight percent $TeO_2$.

References Cited

UNITED STATES PATENTS 3,420,683   1/1969   Ikéda et al. _____ 106—47

FOREIGN PATENTS 1,023,775   3/1966   Great Britain.
540,633   5/1957   Canada.

ROBERT D. EDMONDS, Primary Examiner

U.S. Cl. X.R.

106—53